Aug. 12, 1924.

E. C. TAYLOR 1,504,653

METHOD OF MAKING ANNULAR TUBES

Filed Nov. 16, 1920

INVENTOR

Edward C. Taylor

Patented Aug. 12, 1924.

1,504,653

UNITED STATES PATENT OFFICE.

EDWARD C. TAYLOR, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING ANNULAR TUBES.

Application filed November 16, 1920. Serial No. 424,416.

*To all whom it may concern:*

Be it known that I, EDWARD C. TAYLOR, a citizen of the United States of America, residing at Springfield, in the county of Hampden and State of Massachusetts, have invented certain new and useful Improvements in the Method of Making Annular Tubes, of which the following is a specification.

This invention relates to an improved process of making annular rubber tubes, particularly such tubes as are used for inner tubes of automobile tires. It has for its object a process of making annular tubes having the properties of full molded tubes but having an even wall thickness throughout. It has particular reference to a process of making tubes which will expand uniformly and which will have uniform strain-resisting qualities throughout.

What is perhaps the standard method of making inner tubes consists in vulcanizing the tube upon a straight mandrel, removing it from the mandrel, and then joining the ends to form an annular tube. Tubes made according to this process stretch unevenly under inflation, and, especially in the larger sizes, will wrinkle on the inner circumference of the annulus. It has been proposed to remedy this difficulty by vulcanizing the tube in an annular mold instead of on a straight mandrel, but tubes made according to this process have not been satisfactory as the wall thickness of the tube is uneven. I believe that no tubes have been produced which comprise both the even wall thickness of the tubes vulcanized on straight mandrels and the lack of distortion under inflation of tubes vulcanized in an annular mold. The present process is designed to overcome the defects in the old processes and to produce in an economical and effective manner a tube combining the good qualities of prior tubes without their defects.

My invention will now be described in connection with the accompanying drawings in which—

Figure 1:
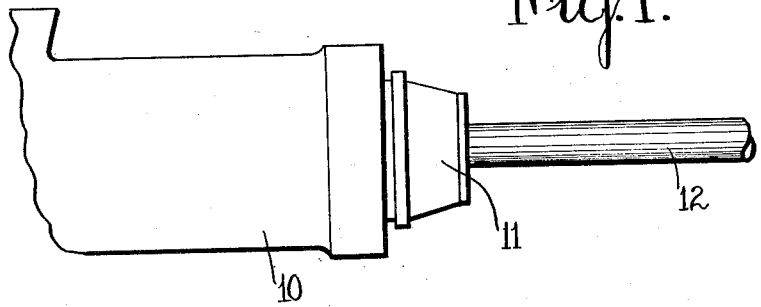
Fig. 1 is a diagrammatic view of a machine for forming rubber tubes by the extrusion process.
Figure 2:
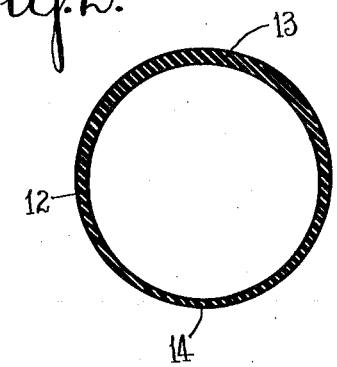
Fig. 2 is a section of the tube produced thereby.
Figure 4:
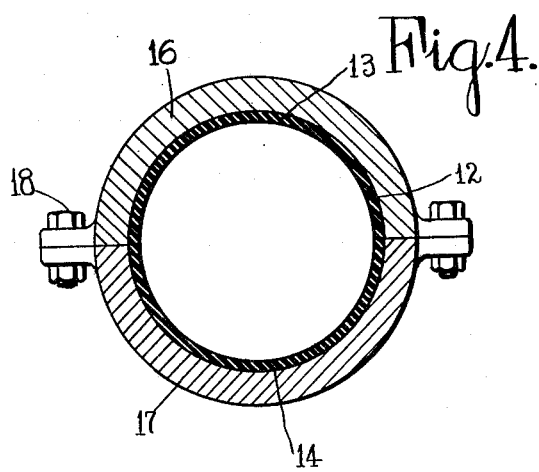
Fig. 4 is a section on line 4—4 of Fig. 3.
Figure 3:
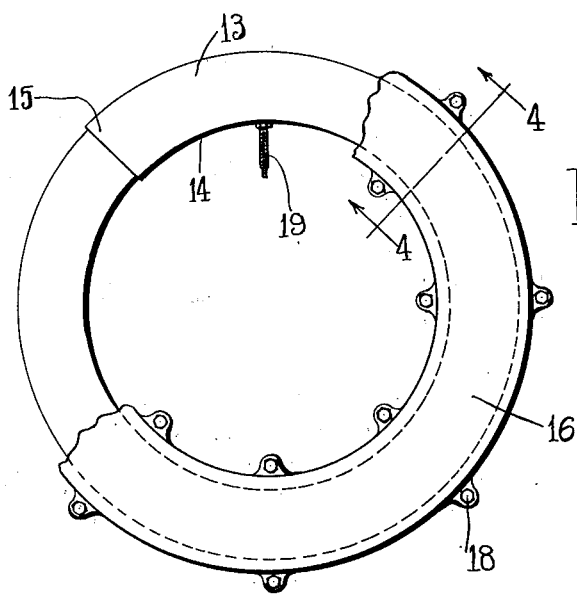
Fig. 3 is a plan view of a mold in which the tube may be vulcanized, the mold being shown partly broken away.

The machine indicated generally at 10 in Fig. 1 may be of the well known type in which rubber is extruded by means of suitable pressure mechanism through a die 11 to form a tube 12. Broadly speaking this type of machine has previously been used for making rubber tubes, it being understood that a suitable mandrel is placed inside die 11 so that the tube extruded is hollow in form. According to the present process, however, this mandrel is placed eccentrically of the die so that the cross-section of the tube will be as shown in Fig. 2 in which one side 13 has a wall thickness greater than the opposite side 14. If desired, the tubing machine may be constructed so as to form a suitable mark on either surface 13 or 14, so that when the tube is later handled the thick or thin portion of the tube can readily be recognized. It will be understood that to facilitate later handling of the tube soapstone or some equivalent may be applied to the inside of the tube during the extrusion process.

The tube thus formed is cut to the proper length so that when it is bent to form an annulus the ends will be joined as shown at 15 by a lap-joint or otherwise so that the tube will be of the proper circumference. In this step of the process, the surface 13 is made the outside circumference of the tube, and surface 14 is made the inside circumference, so that, as will be described, the tube will be of even thickness throughout. In the bending of the straight tube into annular form that portion of the tube which assumes the outer circumference of the annulus is subjected to a greater stretch than that portion of the tube forming the inner circumference for the reason that the outer circumference is of greater length than the inner. By making the thickened portion 13 the outer circumference this stretch will bring the tube to an even thickness throughout.

The vulcanization of the tube is preferably performed within an annular mold containing mold portions 16 and 17 held together by suitable bolts 18 or other devices. The valve 19 by which the tube is to be later inflated is preferably built into place before vulcanization and the annular tube formed as described above expanded into the mold by fluid pressure admitted through this valve. Heat is then applied in any suitable way until vulcanization is completed.

It will be seen that a tube constructed as described above will be of even thickness throughout, will be vulcanized in substantially the form in which it is to be in the finished tire, and will have the splice 15 cured at the same time as the body of the tube, thereby avoiding overcuring of the splice such as was common in tubes vulcanized straight and subsequently spliced.

Having thus described my invention, I claim:

1. The method of making annular tubes comprising forming a straight tube having the wall thickness on one side sufficiently greater than the wall thickness directly opposite to produce a tube of substantially even wall thickness when inflated into annular form, joining the ends of the tube to form an annulus with the thicker part of the tube wall forming the outside of the annulus, expanding the annular tube so formed into an annular mold, and vulcanizing the tube.

2. The method of making annular tubes comprising extruding a tube having an eccentric bore, whereby the wall thickness on one side is greater than the wall thickness directly opposite, bending the tube so formed into an annulus with the thicker wall portion on the outer circumference of the annulus, joining the tube ends, and vulcanizing the annular tube so formed while expanded into an annular mold.

3. The method of making annular tubes comprising forming a straight tube having the wall thickness on one side sufficiently greater than the wall thickness directly opposite to produce a tube of substantially even wall thickness when inflated into annular form, joining the ends of the tube to form an annulus with the thicker part of the tube wall forming the outside of the annulus, and vulcanizing the tube.

EDWARD C. TAYLOR.